May 28, 1968   P. LAUCK III   3,385,958
ELECTRIC BLANKET
Filed Oct. 20, 1965
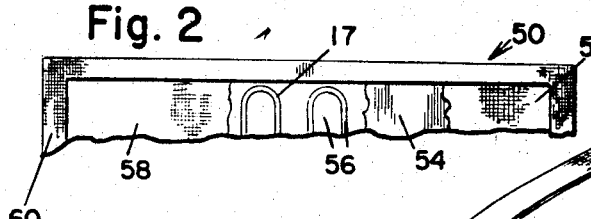
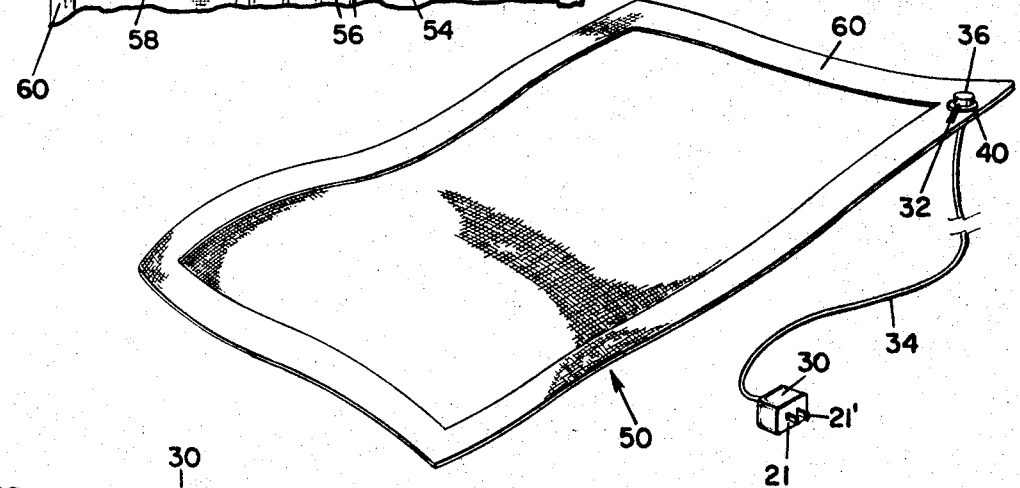
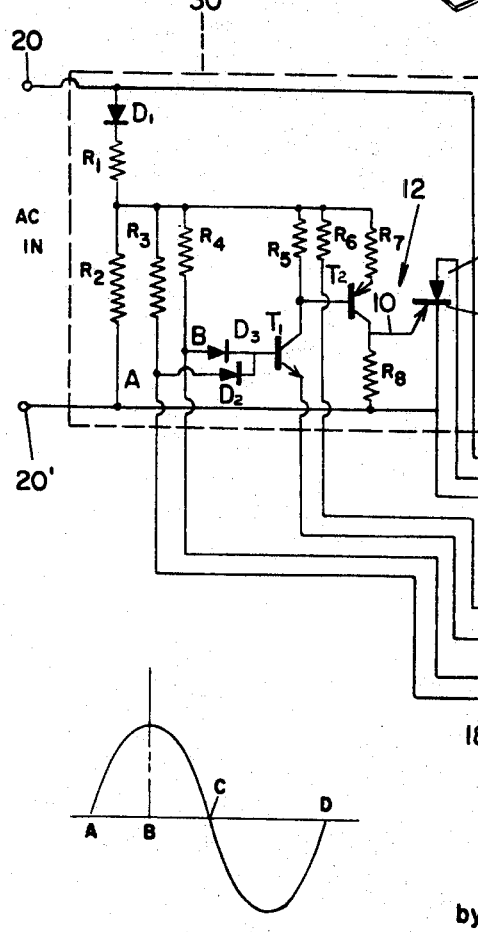
INVENTOR,
Peter Lauck
by Semmes & Semmes

United States Patent Office 3,385,958
Patented May 28, 1968

3,385,958
ELECTRIC BLANKET
Peter Lauck III, Princeton, N.J., assignor of one-half to
Robert H. Myers, Washington, D.C.
Continuation-in-part of application Ser. No. 454,417,
May 10, 1965. This application Oct. 20, 1965, Ser.
No. 498,954
11 Claims. (Cl. 219—501)

ABSTRACT OF THE DISCLOSURE

An electric blanket employing a silicon controlled rectifier to control the heating element of the electric blanket, and having means to select the temperature to which it is desired to heat the sleeping area associated with use of the electric blanket. A control circuit employing transistors is used to control conduction of the silicon controlled rectifier, and thereby the heating element current, to maintain the sleeping area temperature at the desired selected temperature. Further, a plurality of temperature sensitive means positioned in the electric blanket at locations adjacent to selected temperature sensitive areas of a user are connected to the control circuit, to compensate for temperature differences that may occur within the sleeping area, to maintain the overall sleeping area temperature substantially at the desired selected temperature.

---

This application is a continuation-in-part of my copending application for an Electric Blanket, Ser. No. 454,-417, filed May 10, 1965. It is directed to an improvement of the electric blanket described therein, and more particularly, with the temperature control circuit.

The use of electric blankets is common, but in the past temperature controls for such blankets have included electrical elements and circuits which are relatively large in size, thereby necessitating the use of a large central control box with mechanical moving parts.

The electric elements heretofore used to control the temperature of electric blankets, and more particularly, turn off the power supply to the heating element in blankets, have usually been relays, or bi-metallic switches. These are large, slow acting, and do not give sensitive control within the desired temperature range. Furthermore, since bi-metallic switches are large mechanical structures, they are subject to arcing and thus do not function properly at times. My invention is concerned with using a silicon controlled rectifier to switch the heating current on and off, activated by a pulse transistor and controlled by a thermistor control circuit, depending upon the change from the desired temperature or temperature range in the sleeping area rather than in an external box. The silicon controlled rectifier is small, in most cases less expensive, and for its size can handle more heat; that is, it is not damaged by the normal currents associated with electric blankets.

Another part of this invention is to utilize a new type of electric blanket, which comprises three layers of different types of material. The purpose of this, is to have a blanket that will spread heat evenly throughout the blanket and direct it towards the sleeping area. Furthermore, the particular use of different types of layers of material, makes is possible for my blanket to be used as either a blanket or a bedspread, depending upon which way it is placed on the bed.

An object of the present invention is to eliminate the unsightly and space consuming bedside control box, and to utilize a printed circuit device which plugs directly into the wall outlet.

Another object of the present invention is to utilize a temperature control element that is more sensitive than those in use in present day electric blankets, and which will be adjustable by a very small unit mounted within the binding of the electric blanket.

Another object of the present invention is to utilize a porous weave such as a thermal leno or crochet type of material for the electric blanket.

Another object of the present invention is to use a silicon controlled rectifier instead of a bi-metallic switch to turn power to the heating element on and off, depending upon the temperature desired.

Another object of the present invention is to utilize one or a plurality of temperature responsive elements positioned at critical body locations, so that the temperature of the blanket is responsive to the temperature desired at the various locations of the temperature responsive elements in the sleeping area as opposed to the temperature at an external box associated with existing electric blankets.

Another object of the present invention is to utilize a porous weave such as a thermal leno or crochet type of material on one surface of the electric blanket, and a conventional type of blanket material on the other surface, so that the electric blanket may serve as a bedspread when the thermal leno is exposed on a bed surface.

These and other objects of the invention will be apparent from the folowing specification and attached drawings in which:

FIGURE 1 is a perspective view of the blanket and control device connected thereto via a cable;

FIGURE 2 is a cut-away section of the electric blanket, illustrating the various layers of different material utilized;

FIGURE 3 is an electric schematic circuit diagram of the control and heating elements of the electric blanket;

FIGURE 4 is a diagram of the wave form of a conventional 120 volt alternating current power supply.

FIGURE 3 discloses the electric circuitry of the invention. The input to input terminals 20 and 20' consists of a conventional 120 volt, 60 cycle alternating current supply as illustrated in FIGURE 4. Diodes $D_1$ and resistances $R_1$ and $R_2$, form a voltage divider and half wave rectifier combination, which pass only the positive half cycles of the input signal. The relative resistances of resistors $R_1$ and $R_2$ are such that a peak magnitude of $+10$ volts is developed at their common junction or series connection C. The voltage at point C will fluctuate with the alternating current voltage variations applied to the input terminals 20 and 20', although it will always be positive.

Thus, a varying voltage consisting of only positive half cycles, with a peak amplitude of 10 volts, will be applied to the voltage dividers consisting of resistor $R_3$ and thermistor $R_{10}$; and to resistor $R_4$ and thermistor $R_9$. The circuits can be traced from the junction of resistors $R_1$ and $R_2$, resistors $R_3$ and thermistor $R_{10}$, to input terminal 20' (ground); and from the junction of resistors $R_1$ and $R_2$, resistor $R_4$ and thermistor, through $R_9$, to input terminal 20' (ground).

Thermistors $R_9$ and $R_{10}$ are similar thermistors, the resistance of which decreases as the temperature increases. That is, their resistances are inversely proportional to their temperature. Thus, the voltage at junction of resistor $R_3$ and thermistor $R_{10}$, and of resistor $R_4$ and thermistor $R_9$, will vary. This voltage is applied to the heater control circuit. Because the resistances of resistors $R_3$ and $R_4$ are equal, and since thermistors $R_9$ and $R_{10}$ are similar, only the voltage divider consisting of resistor $R_3$ and thermistor $R_{10}$ will be considered in explaining the varying voltage output to the electric heater control circuitry. The voltage divider consisting of resistor $R_4$ and thermistor $R_9$ will behave in a corresponding manner.

As the temperature within the blanket increases as heating element 16, which comprises a series of coils 17, functions to heat the sleeping area, the temperature of thermistor $R_{10}$ will correspondingly increase. Since the resistance of thermistor $R_{10}$ varies inversely as its temperature, a rise in the temperature of $R_{10}$ will cause a corresponding decrease in resistance. This decrease in resistance will cause a greater portion of the total voltage applied to the voltage divider consisting of resistor $R_3$ and thermistor $R_{10}$, to be developed across resistor $R_3$. Thus, an increase of temperature within the sleeping area causes the voltage output at point A to decrease. Point A is coupled to the base of transistor $T_1$ through diode $D_2$.

The series connection of resistor $R_6$, potentiometer 18 and resistor $R_{12}$ determine the emitter bias voltage. By adjusting potentiometer 18 which comprises resistor $R_{11}$ and adjustable arm 22, the bias voltage applied to the emitter of transistor $T_1$ can be made to vary. The emitter bias is variable between approximately +4 to +6 volts, depending upon the setting of the temperature adjustment potentiometer 18. If the temperature adjustment potentiomter 18 is set for the highest calibrated dial temperature, arm 22 of potentiometer 18 would be moved along resistance $R_{11}$ to the junction of $R_{11}$ and $R_6$ to apply the lowest possible voltage to the emitter of transistor $T_1$. At this point approximately +4 volts bias would be applied to the emitter of $T_1$, according to the illustrative example.

When the electric blanket is turned on, the resistance of thermistor $R_{10}$ would normally be relatively high because its temperature would be relatively low. Thus, the voltage output at point A, which is applied across diode $D_2$ to the base of transistor $T_1$, will be higher (more positive) than the emitter bias voltage, because resistor $R_3$ and thermistor $R_{10}$ are connected in series between point C and ground. The voltage output from point A will therefore forward bias transistor $T_1$, causing it to conduct and develop a voltage across the collector load resistor $R_5$ of transistor $T_1$.

The setting of potentiometer 18 thus determines the preset temperature. As the potentiometer arm 22 is varied along resistor $R_{11}$ towards the junction of resistors $R_{11}$ and $R_{12}$, the emitter bias voltage is lowered (with respect to ground), and consequently, the positive bias voltage applied to the base of transistor $T_1$ from point A will be much greater (more positive) than the positive emitter bias voltage, and consequently transistor $T_1$ will conduct for that period of the positive half cycle where it is forward biased. If a lower preset temperature is desired, the potentiometer arm 22 is varied along resistor $R_{11}$ towards the junction of resistances $R_{11}$ and $R_6$, thereby increasing the emitter bias voltage (with respect to ground). Point A is still the same, this will cause transistor $T_1$ to be forward biased for a lesser period of the positive half cycle than under the conditions described above, because the emitter bias voltage will be. When arm 18 is at the junction of resistance $R_{11}$ and $R_{12}$, the emitter bias voltage is approximately +6 volts, under the illustrative example.

That is, transistor $T_1$ comprises an NPN transistor connected in common emitter configuration. Therefore, it conducts when its base is biased positively with respect to its emitter. It is thus seen that the relative resistance values of thermistor $R_{10}$ and potentiometer $R_{11}$ determine the base-emitter biasing characteristics of transistor $T_1$. Further, if the emitter of transistor $T_1$ is more positive than its base, transistor $T_1$ will be biased to the nonconducting state. This would occur normally when the potentiometer $R_{11}$ is set to effect a predetermined sleeping area temperature which is relatively low, compared to the actual temperature existing within the sleeping area, and when the resistance of thermistor $R_{10}$ is correspondingly relatively high.

The voltage developed across collector load resistor $R_5$ of transistor $T_1$, will forward bias the base-emitter of PNP transistor $T_2$. As illustrated in FIGURE 3, the emitter of transistor $T_2$ is connected to the junction of resistors $R_1$ and $R_2$, the peak amplitude of said junction being +10 volts, through resistor $R_7$. The voltage developed across resistor $R_5$ when transistor $T_1$ is forward biased is, however, sufficient to forward bias the base-emitter of transistor $T_2$, and thereby develop a voltage across collector load $R_8$ of transistor $T_2$, and is capable of supplying at least the minimum amount of threshold gate energy to control electrode 10 of silicon controlled rectifier (SCR) 12. Once the SCR has fired, SCR current will flow from input terminal 20 through heating element 16 to anode 11 of the SCR, to cathode 14 of the SCR to terminal 20' (ground), for the remainder of the positive half cycle of voltage being applied to input terminals 20 and 20'. It will thus increase the temperature in the sleeping area. When the negative half cycle is applied to terminals 20 and 20', the SCR 12 cannot conduct because current cannot flow from anode 14 to cathode 11 of the SCR, as is well known.

Thus, SCR 12 can only fire when a positive voltage is applied to the control electrode 10. This, of course, can occur only during the positive half cycle of voltage being applied to the input terminals 20 and 20'. Also SCR 12 can only fire at that point in the positive half cycle when the threshold gate energy is reached and applied to control electrode 10. The silicon controlled rectifier will conduct for the remainder of the positive half cycle, even if the gate energy applied to control electrode 10 falls below the threshold value, and will shut off when the negative half cycle of the input alternating current voltage is applied to terminals 20 and 20'.

Therefore, the transistor configuration illustrated functions as a switch because the base-emitter circuit of transistor $T_1$ enables conduction thereof, only when the sleeping area temperature falls below the preset temperature (determined by the setting of potentiometer 18) to which it is desired to heat and maintain the sleeping area. Thus, the emitter of transistor $T_1$ is at a potential dependent upon the setting of potentiometer 18. The base of the transistor $T_1$ is at a potential determined by the instantaneous resistance of thermistor $R_{10}$. Therefore, the relative instantaneous potential of the base of transistor $T_1$ with respect to its emitter, is determined by the relative resistances of potentiometer 18 and thermistor $R_{10}$.

In order for transistor $T_1$ to conduct, its base must be positive with respect to its emitter. This will occur when the temperature in the sleeping area falls below the preset temperature, thereby increasing the resistance of thermistor $R_{10}$, and driving the base of transistor $T_1$ more positive with respect to its emitter. As explained above, this will cause a positive polarity signal to be applied to gate 10 of SCR 12, that will vary in accordance with the positive portion of the sine wave alternating current input signal. Thus, with reference to FIG. 4, the sine wave input signal increases between points A and B, and at some portion therein the gate threshold energy may be exceeded and the SCR will fire. When the SCR fires, the connection path to the heating element is completed therethrough. Thus, the point in the positive cycle at which the SCR fires is determined by the resistance of thermistor $R_{10}$ in response to the temperature of the sleeping area, and transistors $T_1$ and $T_2$ function as switches to apply a firing control signal to the SCR, only when the temperature within the sleeping area falls below the preset temperature determined by the setting of potentiometer 18.

As the temperature in the blanket successively increases, the temperature of thermistor sensor $R_{10}$ will increase, and its resistance will thereby decrease. This will cause successively lower peak voltages to be present at point A and transistor $T_1$ will conduct for successively shorter portions of the positive half cycle, because it will be forward biased for shorter portions thereof. Thus transistor $T_2$ will be forward biased for a shorter portion of the positive half cycle and consequently SCR 12 will conduct for successively lesser periods of the positive half cycle, as compared to when the temperature in the blanket was lower.

Eventually, the sleeping area temperature will increase to the point where the resistance of thermistor $R_{10}$ will decrease to the level such that the voltage at point A will not be great enough to forward bias transistor $T_1$; this occurs at the preset temperature. Thus, transistors $T_1$ and consequently $T_2$ and SCR 12, will not conduct, and no current will flow through heating element 16. The temperature of the blanket will then slowly cool down due to thermal lag, and when it drops to a point where the resistance of thermistor $R_{10}$ increases to the point where the voltage at point A again forward biases transistor $T_1$, current may again be fed to the heating element 16 when the SCR fires. My circuit is capable of holding the temperature in the sleeping area to a preset temperature of $\pm 1°$ C. utilizing the following components.

| Resistor | Resistance, Ohms | Power Rating, Watts |
| --- | --- | --- |
| $R_1$ | 13K | 2 |
| $R_2$ | 11K | 2 |
| $R_3, R_4$ | 3K | |
| $R_5$ | 2K | |
| $R_6$ | 4.7K | |
| $R_7$ | 10 | |
| $R_8$ | 1K | |
| $R_{11}$ | 5K | |
| $R_{12}$ | 2K | |

All power ratings of resistors are ½ w. unless otherwise noted.

Any type of thermistor can be utilized, which exhibits characteristics close to the Gulton Thermistor 35.5T01 $\pm 1\%$. This provides a fairly large variance in voltage output at point A, about $-1$ volt, with a temperature change from $+25°$ C. to $+35°$ C. The SCR is a 2N3228, and transistors $T_1$ and $T_2$ are silicon transistors 2N1302 and 2N1303, respectively. However, my invention is not limited to the above values of resistors, or to the specific types of thermistors, transistors, and SCR. Any element equivalent to these can be used in my circuit.

FIGURE 3 also shows the relative placement of thermistors $R_9$ and $R_{10}$ at the chest and feet, respectively, of the sleeping person. It is well known that most people experience discomfort when these areas are cold, that is, these are critical temperature sensitive body areas. Hence actuation of the heating element 16 is controlled from these two points, preferably by body temperature. Of course, other thermistors can be placed within the sleeping area at desired locations within the blanket. Although potentiometer 18 regulates both thermistor control circuits comprising thermistors $R_9$ and $R_{10}$ and thereby permits only one preset temperature, it is possible to have separate preset temperature regulators or potentiometers for each thermistor circuit. This will permit different preset temperatures to be selected for each thermistor location.

As illustrated in FIGURES 1 and 3, the electrical elements of the circuit are housed in two distinct sections. Housing 30 comprises SCR 12, transistors $T_1$ and $T_2$, diodes $D_1$, $D_2$ and $D_3$, and resistors $R_1$ through $R_8$. It is small and rectangular in shape, with prongs 21 and 21' connected to terminals 20 and 20' so that housing 30 can plug directly into a conventional AC outlet as illustrated in FIGURE 1. The compact size of housing 30 is made possible because of the use of a printed circuit board, as well as by the small size of the elements contained therein.

Housing 32 comprises resistor $R_{12}$ and potentiometer 18. Again, the use of small electrical elements enables housing 32 to be extremely compact in size. Housing 32 is mounted in the binding 60 of the blanket, as illustrated in FIGURE 1, with temperature selector 36 facing outward. Temperature selector 36 comprises a control knob which is actually the control for the potentiometer arm 22, and is adjustable over the length of resistor $R_{11}$. It selects the desired temperature along scale 40, which is co-extensive with resistor $R_{11}$ and marked off by different designations to indicate successively higher temperatures. This may be in the form of successively higher numbers, as for example from 1-5 or in the form of actual temperatures desired; or in the form of relative temperatures, that is, cool, warm, very warm, etc.

Housings 30 and 32 are connected by seven wire cable 34, with two of the seven wires feeding thermistors $R_9$ and $R_{10}$, two feeding the heating element 16, one being connected to resistor $R_{11}$, one being connected to arm 22, and the remaining one being the ground connection.

This invention also involves a particular design for the blanket 50, which provides more efficient and uniform heating characteristics. As illustrated in FIGURES 1 and 2, the blanket comprises three distinct layers. Layer 52 is the top section of the blanket, and is made up of a regular napped textured blanket material. Layer 54 comprises a cloth reflector which is coated with aluminum on its underside to reflect the heat developed by the layer 56 towards the sleeping area. Layer 56 is an insulated metal-coated layer comprising printed wire circuitry which forms the heating element 16. The final layer 58 of the blanket comprises a thermal leno or crochet, open mesh material. Because of the porosity of layer 58, heat is radiated downwardly from the heating element comprising layer 56 towards the sleeping area.

The placement of the thermistors at critical body locations, and the novel electrical circuitry using half wave pulses, as well as the combination of the different layers of material utilized in the preferred form of my electric blanket, co-act to control the temperature underneath the blanket within the sleeping area. Furthermore, the texture of the thermal leno layer 58 and its appearance is such that it can be used as a very attractive bedspread, and the blanket 50 therefore provides a reversible blanket/bedspread, depending upon the position of layers 52 and 58 on the sleeping area.

Having thus described my invention, I claim the following:

1. An electric blanket which comprises:
   a power supply having two output terminals;
   a heating element positioned in said blanket;
   a silicon controlled rectifier having an anode, a cathode, and a control electrode connected in series with said heating element across said power supply, whereby said silicon controlled rectifier is fired when its gate threshold energy is exceeded to connect said heating element to said power supply,
   at least one thermistor whose resistance varies inversely with temperature located in the blanket;
   control means interconnected with said power supply, said at least one thermistor, and said silicon controlled rectifier, to regulate said silicon controlled rectifier in response to the temperature of said at least one thermistor and comprising
      a transistor having an emitter, a collector, and a base, said collector being connected to one output terminal of said power supply;
      a potentiometer connected between said emitter and the other terminal of said power supply, whereby varying the potentiometer setting varies the base-emitter bias,
   resistance means, said resistance means being connected across said power supply and to said base of said power supply and including
      a diode, a first resistor, and a second resistor connected in series connection between said two output terminals, said diode being poled to pass only positive signals to the base and emitter,
      a third resistor connected between the series connection of said first and second resistors and the base,
      a collector load circuit connected between said collector and said control electrode, whereby when said transistor is activated, the energy developed across said collector load circuit is sufficient to fire said silicon controlled rectifier.

2. The electric blanket recited in claim 1 wherein there are a plurality of thermistors.

3. The electric blanket recited in claim 1 wherein there is a first thermistor connected between the series connection of said third resistor and base, and said other output terminal.

4. The electric blanket recited in claim 3 further comprising:
   a fourth resistor connected between the series connection of said first and second resistors and said base,
   a second thermistor connected between the series connection of said fourth resistor and base, and said other output terminal.

5. The electric blanket recited in claim 4 wherein said first thermistor is positioned in the electric blanket in the area where the feet of the user would normally be, and wherein the second of said plurality of thermistors is positioned in the electric blanket in the area where the chest of the user would normally be.

6. An electric blanket which comprises:
   a power supply having first and second output terminals,
   a heating element positioned in said blanket,
   a controlled rectifier having an anode, a cathode, and a control electrode connected in series with said heating element between said first and second output terminals,
   a transistor having an emitter, a collector, and a base, said collector being connected to the first output terminal,
   variable resistance means connected between said emitter and said second terminal of said power supply,
   a diode, first resistance means, and second resistance means connected in series between said first and second output terminals, said diode being poled to pass only positive signals,
   connection means connecting the series connection of said first and second resistance means to said base,
   at least one thermistor connected between the series connection of the first and second resistance means and said second output terminal,
   a collector load circuit connected between said collector and said control electrode, whereby when said transistor is driven to conduction the energy developed in said collector load circuit is sufficient to cause said controlled rectifier to fire.

7. The electric blanket recited in claim 6 wherein there are a plurality of thermistors.

8. The electric blanket recited in claim 6 wherein the controlled rectifier comprises a silicon controlled rectifier.

9. The electric blanket recited in claim 7 wherein the variable resistance means are mounted in the binding of the electric blanket.

10. The electric blanket recited in claim 9 wherein the controlled rectifier, the transistor, and the rectifier means are mounted in a small housing.

11. The electric blanket recited in claim 6 wherein said at least one thermistor has a negative temperature coefficient.

References Cited
UNITED STATES PATENTS

| | | | |
|---|---|---|---|
| 2,840,680 | 6/1958 | Mills | 219—505 X |
| 2,928,927 | 3/1960 | Taylor | 218—212 X |
| 3,270,184 | 8/1966 | Negromanti | 219—501 |
| 3,337,792 | 8/1967 | Engelson | 323—22 |
| 3,108,175 | 10/1963 | Zartman et al. | 219—212 |
| 3,109,910 | 11/1963 | Fogleman | 219—505 |
| 3,119,926 | 1/1964 | Mills et al. | 219—212 |
| 3,136,877 | 6/1964 | Heller | 219—499 |

RICHARD M. WOOD, *Primary Examiner.*

L. H. BENDER, *Assistant Examiner.*